United States Patent [19]

Goscenski, Jr.

[11] Patent Number: 4,919,008
[45] Date of Patent: Apr. 24, 1990

[54] DIFFERENTIAL SMART CLUTCH WITH GEAR REACTION

[75] Inventor: Edward J. Goscenski, Jr., Battle Creek, Mich.

[73] Assignee: Eaton Corporation, Cleveland, Ohio

[21] Appl. No.: 154,395

[22] Filed: Feb. 10, 1988

[51] Int. Cl.⁵ ............................................. F16H 1/44
[52] U.S. Cl. ................................................... 475/234
[58] Field of Search ............................ 74/710.5, 711

[56] References Cited

U.S. PATENT DOCUMENTS

| | | | |
|---|---|---|---|
| 1,659,833 | 2/1928 | Norrlin | 74/710.5 |
| 2,650,507 | 9/1953 | Clintsmann | 74/710.5 X |
| 2,778,245 | 1/1957 | Thornton | 74/711 |
| 2,991,664 | 7/1961 | Bernotas | 74/711 |
| 3,109,323 | 11/1963 | Saurer | 74/711 |
| 3,158,042 | 11/1964 | Saurer | 74/711 |
| 3,350,961 | 11/1967 | Dodge | 74/711 |
| 3,546,969 | 12/1970 | Gibson et al. | 74/711 |
| 3,628,399 | 12/1971 | Seitz et al. | 74/711 |
| 3,986,258 | 6/1965 | Meldola | 74/710.5 |
| 4,412,459 | 11/1983 | Goscenski | 74/711 |
| 4,679,463 | 7/1987 | Ozaki et al. | 74/711 |
| 4,805,486 | 2/1989 | Hagiwara et al. | 74/710.5 |
| 4,811,628 | 3/1989 | Winkam et al. | 74/710.5 |
| 4,841,808 | 6/1989 | Ouchi et al. | 74/711 X |

FOREIGN PATENT DOCUMENTS

| | | | |
|---|---|---|---|
| 0189556 | 8/1986 | European Pat. Off. | 74/711 |
| 1178659 | 9/1964 | Fed. Rep. of Germany | 74/710.5 |
| 2549408 | 5/1976 | Fed. Rep. of Germany | 74/710.5 |

Primary Examiner—Leslie A. Braun
Assistant Examiner—Harold F. Macris
Attorney, Agent, or Firm—L. J. Kasper

[57] ABSTRACT

A differential gear mechanism is provided of the type including a gear case (17), at least one pinion gear (21), and a pair of side gears (27 and 29). Clutch packs (43 and 45) are disposed between the side gears and the gear case and are operable, when engaged, to retard relative rotation between the gear case and the side gears. Surrounding the gear case is a fluid pressure mechanism (71) including a cylinder (73) and a piston (75), both of which are rotationally stationary, but free to move axially. Adjacent the piston-cylinder assembly is a pair of reaction members (61 and 63) which transmit the axial displacements of the piston and cylinder, by means of members (57 and 59), to a pair of load plates (53 and 55), such that the displacements exert axially-outward biasing forces on the side gears and on the clutch packs. Because the piston-cylinder assembly is external to the gear case, no rotating seals are required. In addition, because the hydraulic biasing forces act in the same direction as normal gear reaction forces, less hydraulic force is required to actuate the clutch packs.

16 Claims, 3 Drawing Sheets

DIFFERENTIAL SMART CLUTCH WITH GEAR REACTION

BACKGROUND OF THE DISCLOSURE

The present invention relates to limited slip differentials, and more particularly, to such differentials of the type having means for retarding differentiating action, and actuating means for actuating the retarding means.

Limited slip differentials of the type to which the present invention relates typically include a gear case defining a gear chamber and disposed therein a differential gear set including at least one pinion gear and a pair of bevel side gears. A clutch pack is typically disposed between each of the side gears and the adjacent surface of the gear case, such that the clutch pack is operable to retard rotation between the gear case and the side gears.

In many limited slip and/or locking differentials, some sort of actuating mechanism is provided to actuate or move the clutch pack to its engaged condition. One of the current trends in the field of vehicle traction modifiers involves the desire to be able to actuate the clutch packs in response to an external signal, rather than in response to the sensing of a predetermined speed differential as has typically been the case in the prior art.

A typical prior art limited slip differential, actuated in response to an external fluid pressure signal, is illustrated in U.S. Pat. No. 2,991,664. Although it is considered possible to produce a somewhat satisfactory limited slip differential in accordance with the teachings of the prior art, there are distinct disadvantages of the prior art design which limit its commercial desirability. In the cited prior art, the clutch pack is actuated by a pressure-actuated piston, disposed adjacent the end of the clutch pack. Therefore, it is necessary to communicate the external fluid pressure signal into the differential gear case, thus requiring rotating seals. In addition, the hydraulic pressure acting on the clutch pack is acting in opposition to the gear reaction forces which inherently occur during differentiation. The result is a need for an even greater fluid pressure, further increasing the likelihood of fluid leakage.

Another disadvantage is that most limited slip differentials would need major redesign of the gear case and associated structure in order to utilize the actuation means of the cited reference.

SUMMARY OF THE INVENTION

Accordingly, it is an object of the present invention to provide an improved limited slip differential of the type in which the clutch pack is actuated in response to an external signal, wherein the differential overcomes the problems associated with typical prior art differentials.

More specifically, it is an object of the present invention to provide an improved limited slip differential in which the clutch actuating means exerts an actuating force on the clutch packs, aiding the normal biasing force exerted by each of the side gears as a result of gear reaction forces.

It is another object of the present invention to provide an improved limited slip differential which achieves the above-stated objects, and which eliminates the need for rotating fluid pressure seals.

The above and other objects of the present invention are accomplished by the provision of an improved differential gear mechanism of the type described above wherein the clutch means comprises at least a pair of clutching surfaces disposed to be engaged in response to movement of each of the side gears toward the adjacent surface of the gear case. An actuating means is included for actuating the clutch means, the actuating means comprising a fluid pressure actuated displacement mechanism operable to achieve an output displacement in response to an external fluid pressure signal. The improved differential is characterized by the actuating means including means operable in response to the output displacement to exert an axially-outward force on the side gears, aiding the normal outward force exerted by each of the side gears on the respective clutching surfaces, as a result of gear reaction forces, during differentiation.

In accordance with a more limited aspect of the present invention, the fluid pressure actuated displacement mechanism is a piston-cylinder assembly which is generally annular and is disposed to surround a portion of the gear case, the assembly being rotationally stationary, and the gear case being rotatable relative to the piston-cylinder assembly.

DESCRIPTION OF THE PREFERRED EMBODIMENT

Figure 1:
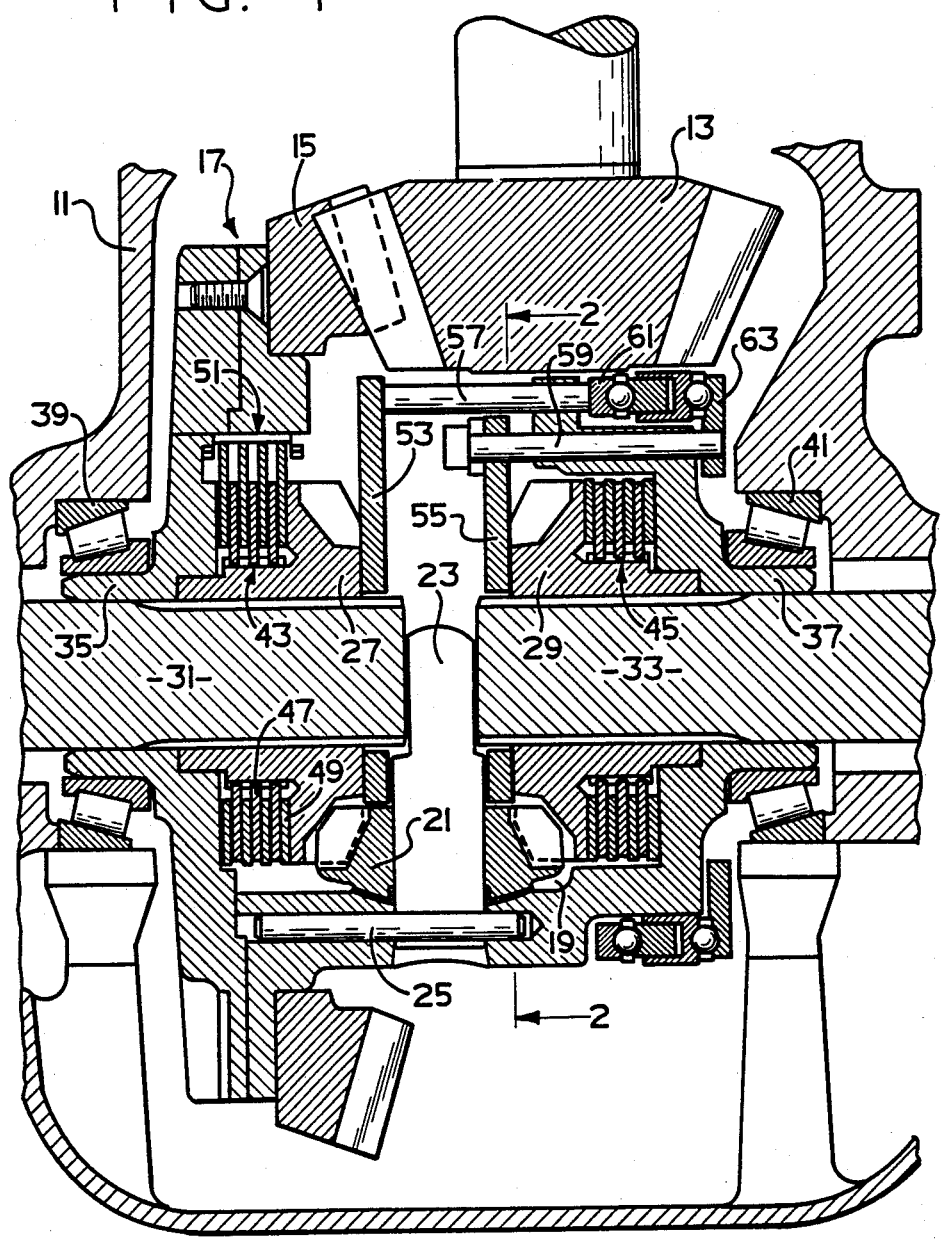
FIG. 1 is an axial cross-section of a limited slip differential of the type with which the present invention may be utilized.

Referring now to the drawings which are not intended to limit the present invention, FIG. 1 illustrated a limited slip differential of the type which may utilize the present invention. FIG. 1 illustrates a fragmentary view of a stationary, outer differential housing 11, which rotatably supports a shaft on which is mounted an input pinion gear 13, driven by the vehicle driveline. The pinion gear 13 is in toothed, driving engagement with a ring gear 15, which is attached in any suitable manner to a differential gear case, generally designated 17.

The gear case 17 defines a gear chamber, generally designated 19, and disposed therein is a differential gear set, preferably including a plurality of planet pinion gears 21 (only one of which is shown in FIG. 1), rotatably mounted on a pinion shaft 23, which is secured to the gear case 17 by means of a pin 25.

The planet pinion gears 21 comprise the input gears of the differential gear set, and are in meshing engagement with a pair of side gears 27 and 29, which comprise the output of the differential gear set. The side gears 27 and 29 are splined to a pair of axle shafts 31 and 33, respectively. The gear case 17 includes a pair of annular hub portions 35 and 37 on which are mounted the inner races of bearing sets 39 and 41, respectively, which are used to provide rotational support of the gear case 17 relative to the outer differential housing 11.

During normal, straight-ahead operation of the vehicle, no differentiating action occurs between the left and right axle shafts 31 and 33, and the pinion gears 21 do not rotate relative to the pinion shaft 23. Therefore, the gear case 17, the pinions 21, the side gears 27 and 29, and the axle shafts 31 and 33 all rotate about the axis of the shaft 31 and 33, as a solid unit.

Under certain operating conditions, such as when the vehicle is turning, or a slight difference in tire size exists, it is permissible for a certain amount of differentiating action to occur between the side gears 27 and 29. However, it is desirable to be able to retard the relative rotation between the gear case 17 and the side gears 27 and 29, to prevent excessive differentiating action which, under certain operating conditions, could result in a spin-out of one of the axle shafts, and a loss of driving traction.

In order to retard differentiating action, the differential gear mechanism is provided with a retarding means for retarding differentiating action, and an actuating means for actuating the retarding means. In the subject embodiment, the retarding means comprises a clutch pack, generally designated 43, disposed between the side gear 27 and the adjacent surface of the gear case 17, and a clutch pack, generally designated 45, disposed between the side gear 29 and the adjacent surface of the gear case 17. Furthermore, in the subject embodiment, each of the clutch packs is of the multiple disc type and includes a plurality of clutch discs 47 which are splined to the side gears 27 and 29, and interdigitated therewith, a plurality of clutch discs 49 which are rotationally fixed relative to the gear case 17 by an "ear" arrangement, generally designated 51, of the type which is well known in the art.

ACTUATION OF CLUTCH PACKS

All of the structure described up to this point is well known in the art in terms of construction details and mode of operation. The present invention, which will now be described in some detail, is directed to an improved actuating means for actuating the clutch packs 43 and 45 to retard differentiating action. As was described in the background of the specification, one of the current trends in the field of vehicle traction modifiers is to be able to operate a traction modifier in the "limited slip" or "locking" mode in response to an external signal, typically, microprocessor controlled. Therefore, the present invention provides an improved differential gear mechanism wherein the clutch packs 43 and 45 can be actuated to an engaged condition in response to an external fluid pressure signal.

Figure 2:
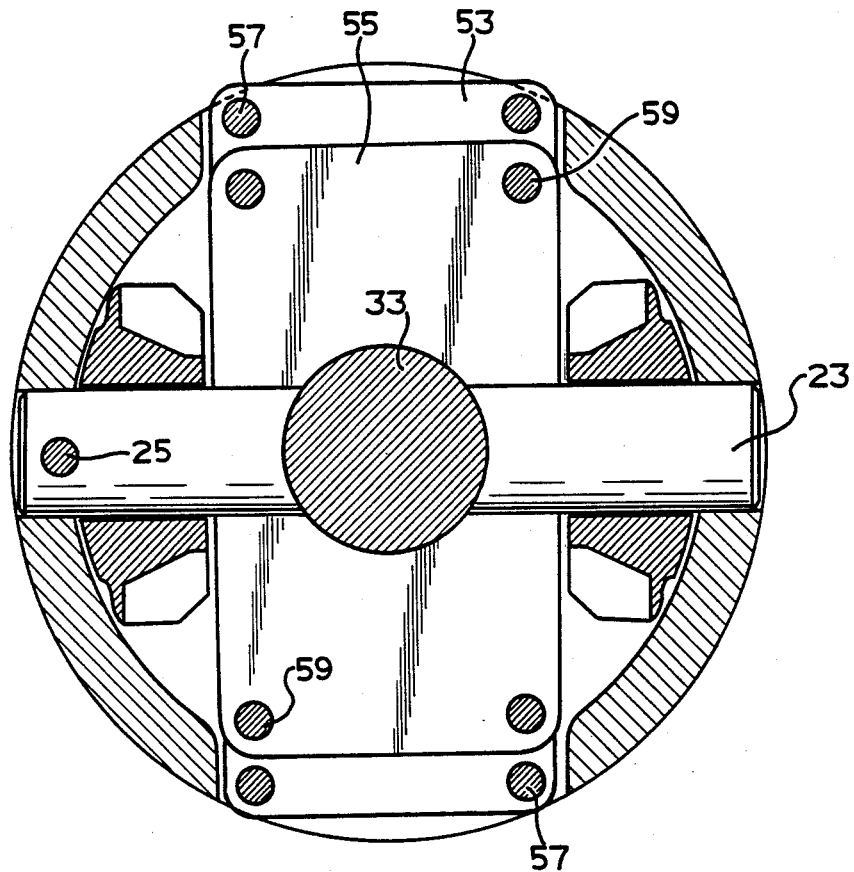
FIG. 2 is a transverse cross-section, taken on line 2—2 of FIG. 1, illustrating part of the clutch-actuating mechanism of the present invention.
Figure 3:
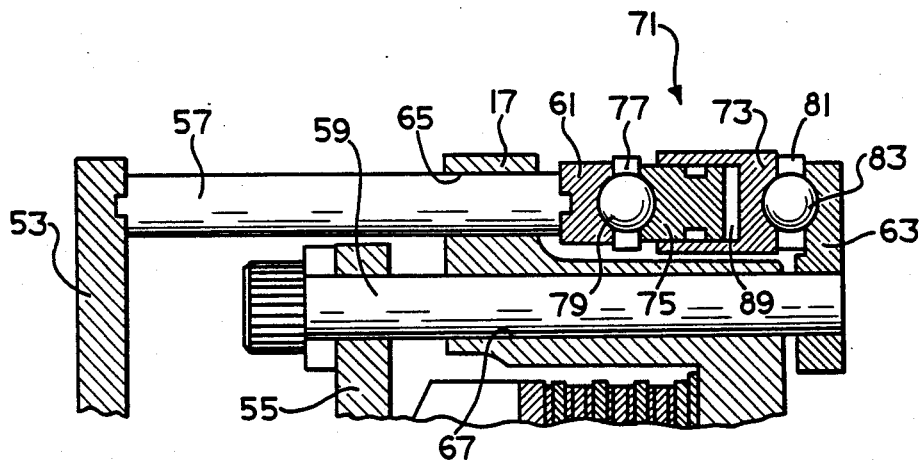
FIG. 3 is an enlarged, fragmentary view, similar to FIG. 1, illustrating the piston-cylinder arrangement of the present invention.

Referring now to FIG. 1, in conjunction with FIG. 2, the differential of the present invention includes a load plate 53, disposed in engagement with the axially-inner face of the side gear 27, and in addition, a load plate 55, in engagement with the axially-inner face of the side gear 29. As may best be seen in FIG. 2, the load plates 53 and 55 are generally rectangular, with the load plate 53 being somewhat "longer" for reasons which will become apparent subsequently. As is also seen best in FIG. 2, there are four elongated, rod-like members 57 in engagement with the load plate 53, and extending therefrom to the right in FIG. 1. Similarly, there are four elongated, rod-like members 59 in engagement with the load plate 55. Referring now primarily to FIG. 3, in conjunction with FIG. 1, the right ends of the members 57 are seated against an annular reaction member 61. Similarly, the right ends of the rod-like members 59 are threaded into openings in an annular reaction member 63. It should be noted that each of the rod-like members 57 passes through an opening 65 defined by the gear case 17, and similarly, each of the rod-like members 59 passes through an opening 67 defined by the gear case 17. Therefore, when the gear case 17 and the differential gearing contained therein rotates about the axis of the axle shafts 31 and 33, the load plates 53 and 55, the members 57 and 59 and the reaction members 61 and 63 all rotate with the gear case 17, as a solid unit, about the axis of the axle shafts 31 and 33.

As may best seen in FIG. 1, the annular reaction members 61 and 63 are disposed external to the gear case 17, and in concentric, surrounding relationship thereto. Referring also to FIG. 3, there is a fluid pressure actuated displacement mechanism, generally designated 71, disposed between the reaction members 61 and 63. In the preferred embodiment of the invention, the mechanism 71 comprises an annular cylinder member 73, having a generally U-shaped cross-section, and an annular piston member 75, received within the cylinder 73, for relative axial displacement therebetween. It is an important feature of the present invention that the assembly of the cylinder 73 and piston 75 is rotationally stationary, i.e., neither is permitted to rotate, although both are free to move axially, a small distance. Disposed between the reaction member 61 and the piston 75 is an annular retainer ring 77 which retains a plurality of ball bearings 79, only one of which is shown in FIG. 3. Similarly, disposed between the reaction member 63 and the cylinder 73 is an annular retainer ring 81, which retains a plurality of ball bearings 83. Therefore, the various parts described previously which rotate with the gear case 17 are free to rotate relative to the stationary displacement mechanism 71.

Figure 4:
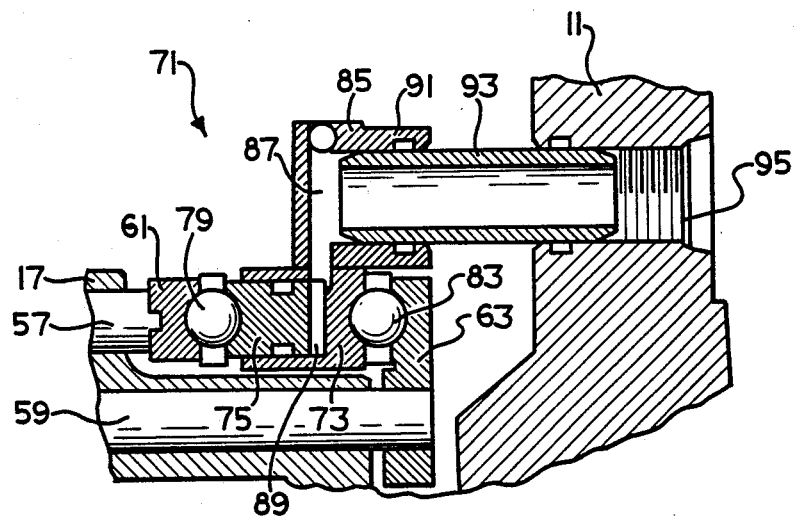
FIG. 4 is an enlarged, fragmentary view, on the same scale as FIG. 3, but taken on a different radial plane than FIG. 3.

Referring now primarily to FIG. 4, which is taken on a different radial plane than FIG. 3, it may be seen that the annular cylinder 73 has an inlet fitting portion 85 which, preferably, is formed integrally with the member 73. The inlet fitting portion 85 defines a fluid passage 87 which is in open communication with an annular chamber 89, cooperatively defined by the cylinder 73 and piston 75. Extending to the right in FIG. 4, the fitting portion 85 includes an annular portion 91, within which is disposed a short, cylindrical fluid coupling member 93. The right end of the coupling member 93 is received within an opening defined by the differential housing 11. Disposed adjacent the right end of the coupling member 93, the differential housing 11 defines a threaded fluid port 95, adapted for connection of an external fluid pressure signal line.

OPERATION

Under normal operating condition, the annular chamber 89 and port 95 would be vented to the system reservoir, and normal limited slip type differentiating action would occur. If a condition (e.g., imminent spin-out, etc.) is sensed which indicates the need for additional bias torque or retardation of differentiation, an external fluid pressure input signal is communicated to the port 95, and from there through the interior of the coupling member 93 to the annular chamber 89. The increased fluid pressure in the chamber 89 displaces the annular cylinder 73 and the annular piston 75 axially outward relative to each other. These axial displacements are, in turn, transmitted through the ball bearings 79 and 83, to the reaction members 61 and 73.

Displacement of the reaction member 61 to the left in FIG. 1 biases the load plate 53 to the left, by means of the rod-like members 57. At the same time, the displacement of the reaction member 63 to the right biases the load-plate 55 to the right, by means of the rod-like members 59. The result is an axially-outward biasing force exerted by the load plates 53 and 55, through the side gears 27 and 29, respectively, to engage the clutch packs 43 and 45, respectively. As will be understood by those skilled in the art, the amount of force exerted by the load plates 53 and 55 on gears 27 and 29 and, in turn, on the clutch packs 43 and 45, is proportional to the fluid pressure in the chamber 89. However, the force exerted on the clutch packs 43 and 45 is equal to the force exerted by the load plates 53 and 55, plus the gear reaction forces from side gears 27 and 29, respectively. The gear reaction force is substantially increased above typical gear reaction forces because of the force generated by the load plate, which increases the torque transmitted by the gears and, in turn, the gear reaction force. Thus, the displacement mechanism 71 needs to supply only a portion of the force required on clutch packs 43 and 45, in order to provide the desired retarding or bias torque.

The invention has been described in great detail, sufficient to enable one skilled in the art to practice the invention. It is believed that various alterations and modifications of the invention will become apparent to those skilled in the art from a reading and understanding of the foregoing specification, and it is intended to include all such alterations and modifications as part of the invention, insofar as they come within the scope of the appended claims.

I claim:

1. A differential gear mechanism of the type including a gear case defining a gear chamber; a differential gear arrangement disposed in said gear chamber, said differential gear arrangement including at least one pinion gear and a pair of bevel side gears in meshing engagement with said pinion gear; clutch means operable between a disengaged condition and an engaged condition, effective to retard relative rotation between said gear case and each of said side gears, said clutch means comprising at least a pair of clutching surfaces with each of said side gears disposed to be engaged in response to movement of each of said side gears toward an adjacent surface of said gear case; and actuating means for actuating said clutch means, said actuating means comprising a fluid pressure actuated displacement mechanism operable to achieve an output displacement in response to an external fluid pressure input signal, characterized by:
   (a) said fluid pressure actuated displacement mechanism being disposed external to said gear case; and
   (b) said actuating means including means operable in response to said output displacement to exert an axially outward biasing force on said side gears, aiding a normal biasing force exerted by each of said side gears on the respective clutching surfaces, as a result of gear reaction forces, during differentiation.

2. A differential gear mechanism as claimed in claim 1 characterized by said fluid pressure actuated displacement mechanism comprises a piston-cylinder assembly.

3. A differential gear mechanism as claimed in claim 1 characterized by said fluid pressure actuated displacement mechanism comprises a single piston-cylinder assembly operable to axially bias both pairs of clutching surfaces into engagement simultaneously.

4. A differential gear mechanism as claimed in claim 2 characterized by said piston-cylinder assembly being generally annular and disposed to surround a portion of said gear case.

5. A differential gear mechanism as claimed in claim 4 characterized by said piston-cylinder assembly being rotationally stationary, and said gear case being rotatable relative to said piston-cylinder assembly.

6. A differential gear mechanism as claimed in claim 5 characterized by said differential gear mechanism further including a stationary, outer differential housing, and a fluid pressure coupling interconnecting said outer housing and said piston-cylinder assembly, to communicate said external fluid pressure input signal to said piston-cylinder assembly.

7. A differential gear mechanism as claimed in claim 1 characterized by said means operable in response to said output displacement comprising comprising a pair of load plates disposed axially inwardly of said side gears, and in engagement therewith, and further comprising a pair of load plates disposed axially inwardly of said side gears, and in engagement therewith, and further comprising means to transmit said output displacement into axially outward movement of said load plates.

8. A differential gear mechanism as claimed in claim 7 characterized by said displacement mechanism comprising a rotationally stationary piston-cylinder assembly, said piston and said cylinder both being axially displaceable in response to said external fluid pressure input signal.

9. A differential gear mechanism as claimed in claim 8 characterized by said means to transmit said output displacement further comprising a pair of generally annular reaction members disposed axially adjacent said piston and said cylinder, and operably associated therewith and further comprising means interconnecting said reaction members and said load plates to transmit axial displacement of said piston and said cylinder to said load plates.

10. A differential gear mechanism of the type including a gear case defining a gear chamber; a differential gear arrangement disposed in said gear chamber including at least one input gear and a pair of output gears; clutch means operable between a disengaged condition and an engaged condition, effective to retard relative rotation between said gear case and said output gears; and actuating means for actuating said clutch means, said actuating means comprising a fluid pressure actuated displacement mechanism operable to achieve an output displacement in response to an external fluid pressure input signal, characterized by:
   (a) said fluid pressure actuated displacement mechanism is disposed external to said gear case; and
   (b) said actuating means includes means operable in response to said output displacement to exert an axially-outward biasing force on said clutch means.

11. A differential gear mechanism as claimed in claim 10 characterized by said fluid pressure actuated displacement mechanism comprises a generally annular piston-cylinder assembly, disposed to surround a portion of said gear case.

12. A differential gear mechanism as claimed in claim 11 characterized by said piston-cylinder assembly being rotationally stationary, and said gear case being rotatable relative to said piston-cylinder assembly.

13. A differential gear mechanism as claimed in claim 12 characterized by said differential gear mechanism further including a stationary, outer differential housing, and a fluid pressure coupling interconnecting said outer housing and said piston-cylinder assembly, to communicate said external fluid pressure input signal to said piston-cylinder assembly.

14. A differential gear mechanism as claimed in claim 10 characterized by said means operable in response to said output displacement comprising a pair of load plates disposed axially-inwardly of said clutch means, and further comprising means to transmit said output displacement into axially-outward movement of said load plates.

15. A differential gear mechanism as claimed in claim 14 characterized by said displacement mechanism comprising a rotationally stationary piston-cylinder assembly, said piston and said cylinder both being axially displaceable in response to said external fluid pressure input signal.

16. A differential gear mechanism as claimed in claim 15 characterized by said means to transmit said output displacement further comprising a pair of generally annular reaction members disposed axially adjacent said piston and said cylinder, and operably associated therewith and further comprising means interconnecting said reaction members and said load plates to transmit axial displacement of said piston and said cylinder to said load plates.

* * * * *